(12) United States Patent
Sharma et al.

(10) Patent No.: US 10,640,155 B2
(45) Date of Patent: May 5, 2020

(54) UTILITY VEHICLE TRANSFORMABLE CARGO BOX

(71) Applicant: Deere & Company, Moline, IL (US)

(72) Inventors: Praveen Sharma, Mandsaur (IN); Rupali Patil, Jalgaon (IN); Parag B. Kulkarni, Pune (IN); Muzaffar Hasnain, Chandigarh (IN); Abhijit Gade, Pune (IN)

(73) Assignee: DEERE & COMPANY, Moline, IL (US)

( * ) Notice: Subject to any disclaimer, the term of this patent is extended or adjusted under 35 U.S.C. 154(b) by 181 days.

(21) Appl. No.: 15/967,008

(22) Filed: Apr. 30, 2018

(65) Prior Publication Data
US 2019/0329713 A1 Oct. 31, 2019

(51) Int. Cl.
| | |
|---|---|
| B62D 33/027 | (2006.01) |
| B60P 3/42 | (2006.01) |
| B60R 9/06 | (2006.01) |
| B62D 33/023 | (2006.01) |
| B62D 47/00 | (2006.01) |

(52) U.S. Cl.
CPC ............ *B62D 33/027* (2013.01); *B60P 3/423* (2013.01); *B60R 9/06* (2013.01); *B60R 9/065* (2013.01); *B62D 33/023* (2013.01); *B62D 47/003* (2013.01)

(58) Field of Classification Search
CPC ... B60P 3/42; B60P 3/423; B60R 5/04; B60R 9/06; B62D 33/023; B62D 33/027; B62D 33/08; B62D 47/003
USPC .................................................... 296/10, 14
See application file for complete search history.

(56) References Cited

U.S. PATENT DOCUMENTS

| | | | |
|---|---|---|---|
| 6,923,507 B1 * | 8/2005 | Billberg | B60P 1/286 296/183.2 |
| 6,994,388 B2 | 2/2006 | Saito et al. | |
| 7,249,798 B2 | 7/2007 | Saito et al. | |
| 7,578,544 B1 | 8/2009 | Shimamura et al. | |
| 7,581,780 B2 | 9/2009 | Shimamura et al. | |
| 7,735,889 B2 | 6/2010 | Yamamura et al. | |
| 7,841,639 B2 | 11/2010 | Tanaka et al. | |
| 7,874,605 B2 | 1/2011 | Smith et al. | |
| 7,874,606 B2 | 1/2011 | Yamamura et al. | |
| RE42,086 E | 2/2011 | Saito et al. | |
| 7,992,911 B2 | 8/2011 | Naruoka et al. | |
| 8,002,331 B2 | 8/2011 | Bowers | |
| 8,016,337 B2 | 9/2011 | Itou et al. | |
| 8,075,040 B2 | 12/2011 | Arnold | |
| 8,096,600 B2 | 1/2012 | Shinnoki et al. | |
| 8,128,144 B2 | 3/2012 | Mahara et al. | |
| 8,136,857 B2 | 3/2012 | Shimizu et al. | |
| 8,136,859 B2 | 3/2012 | Morita et al. | |
| 8,205,924 B2 | 6/2012 | Masuda et al. | |
| 8,215,690 B2 | 7/2012 | Nishiike et al. | |

(Continued)

*Primary Examiner* — Jason S Daniels

(57) ABSTRACT

A utility vehicle transformable cargo box includes a cargo box floor, a first base panel hinged to the front of the cargo box floor, and a second base panel hinged to a front of the first base panel and to a load guard that can slide between a first non-extended position and a second extended position. A pair of side extension panels are pivotably attached to the ends of the load guard, are positioned up against the load guard in the first non-extended position, and extend forward from the cargo box walls in the second extended position.

11 Claims, 10 Drawing Sheets

(56) References Cited

U.S. PATENT DOCUMENTS

| | | |
|---|---|---|
| 8,235,443 B2 | 8/2012 | Kokawa et al. |
| 8,240,737 B2 | 8/2012 | Takaya et al. |
| 8,267,454 B2 | 9/2012 | Takano et al. |
| 8,303,012 B2 | 11/2012 | Sumi et al. |
| 8,303,013 B2 | 11/2012 | Horiuchi et al. |
| 8,303,014 B2 | 11/2012 | Orihashi et al. |
| 8,313,136 B2 | 11/2012 | Arnold et al. |
| 8,322,767 B2 | 12/2012 | Morita et al. |
| 8,322,770 B2 | 12/2012 | Kosuge et al. |
| 8,322,772 B1 | 12/2012 | Gilbeck et al. |
| 8,328,261 B2 | 12/2012 | Kanazawa et al. |
| 8,328,262 B2 | 12/2012 | Kawabata et al. |
| 8,328,266 B2 | 12/2012 | Yasui et al. |
| 8,348,322 B2 | 1/2013 | King |
| 8,353,534 B2 | 1/2013 | Arnold et al. |
| 8,376,441 B2 | 2/2013 | Nakamura et al. |
| 8,414,050 B2 | 4/2013 | Kosuge et al. |
| 8,414,082 B2 | 4/2013 | Nakamura et al. |
| 8,465,074 B2 | 6/2013 | Sakata et al. |
| 8,499,870 B2 * | 8/2013 | Nakamura ............ F02M 35/048 180/68.3 |
| 8,511,732 B2 | 8/2013 | Inoue et al. |
| 8,550,500 B2 | 10/2013 | Yamamoto et al. |
| 8,556,324 B1 | 10/2013 | Yamamoto et al. |
| 8,585,116 B2 | 11/2013 | King |
| 8,668,236 B1 | 3/2014 | Yamamoto et al. |
| 8,672,387 B1 | 3/2014 | Kaku et al. |
| 8,690,217 B2 | 4/2014 | Yamamoto et al. |
| 8,714,618 B1 | 5/2014 | Heit et al. |
| 8,752,878 B2 | 6/2014 | Yamamoto et al. |
| 8,783,754 B1 | 7/2014 | Peterson et al. |
| 8,833,837 B2 | 9/2014 | Kaku et al. |
| 8,960,805 B2 | 2/2015 | Nakamura et al. |
| 9,004,532 B1 | 4/2015 | Hirooka |
| 9,039,060 B1 * | 5/2015 | Yamamoto ............... B60N 2/24 296/183.1 |
| 9,056,576 B2 | 6/2015 | Yamamoto et al. |
| 9,061,601 B2 | 6/2015 | Uchiyama et al. |
| 9,150,182 B1 | 10/2015 | Schlangen et al. |
| 9,216,777 B2 | 12/2015 | Nakamura et al. |
| 9,242,680 B2 | 1/2016 | Schwab |
| 9,352,496 B2 | 5/2016 | Takahashi et al. |
| 9,403,467 B2 | 8/2016 | Takahashi et al. |
| 9,403,560 B2 | 8/2016 | Nakao et al. |
| 9,457,756 B2 | 10/2016 | Hirooka et al. |
| 9,555,701 B2 | 1/2017 | Borowicz et al. |
| 9,592,782 B2 | 3/2017 | Raska et al. |
| 9,623,912 B2 | 4/2017 | Schlangen |
| 9,902,292 B2 * | 2/2018 | Wakabayashi ......... B60K 13/04 |

\* cited by examiner

UTILITY VEHICLE TRANSFORMABLE CARGO BOX

FIELD OF THE INVENTION

This invention relates to utility vehicles for off road or recreational use, and more specifically to transformable cargo boxes for utility vehicles.

BACKGROUND OF THE INVENTION

Utility vehicles for off-road and recreational use may have two rows of seats, with one row behind the other, for seating 4 to 6 passengers. A cargo box also may be provided behind the second or rear seat. Some utility vehicles have a rear seat and a cargo box that are fixed. However, when the second or rear seat is not used for carrying passengers, it is desirable to use that space for carrying cargo.

For that reason, some off-road or recreational utility vehicles include a rear seat that is retractable and a cargo box that is expandable into the space formerly occupied by the rear seat. There are a number of such utility vehicles with conversion mechanisms to retract the rear seat and expand the cargo box into the rear seat area. These conversion mechanisms may require two persons and/or multiple steps to retract the rear seat and expand the cargo box, and are subject to wear over time that may slow or interfere with their use.

A transformable cargo box for an off-road or recreational utility vehicle is needed that one person can operate to transform a rear seat area to an expanded cargo box with a minimal number of steps. A transformable cargo box is needed for an off-road or recreational utility vehicle that is simple and quick to operate, and has few mechanical components that are subject to wear that may restrict their use. A transformable cargo box is needed that may be raised for dumping in either a first non-extended position, or in a second extended position.

SUMMARY OF THE INVENTION

A utility vehicle transformable cargo box includes a load guard on the front of a cargo box, the load guard being positionable at a first non-extended position behind a seating area and a second extended position at least partially over the seating area. The transformable cargo box also includes a pair of side extension panels; each side extension panel hinged to a load guard of the cargo box and positioned up against the side wall in the first non-extended position, and extending forwardly from one of the sidewalls of the cargo box in the second extended position. The transformable cargo box also includes a first base panel hinged to the load guard, and a second base panel hinged between the first base panel and a floor of the cargo box. The first and second base panels are folded against the pair of side extension panels in the first non-extended position, and are positioned horizontally in front of the cargo box floor in the second extended position. The transformable cargo box may be converted from the first non-extended position to the second extended position with a minimal number of steps, is relatively easy to operate, and has few mechanical components that may be subject to wear.

DESCRIPTION OF THE PREFERRED EMBODIMENT

Figure 1:
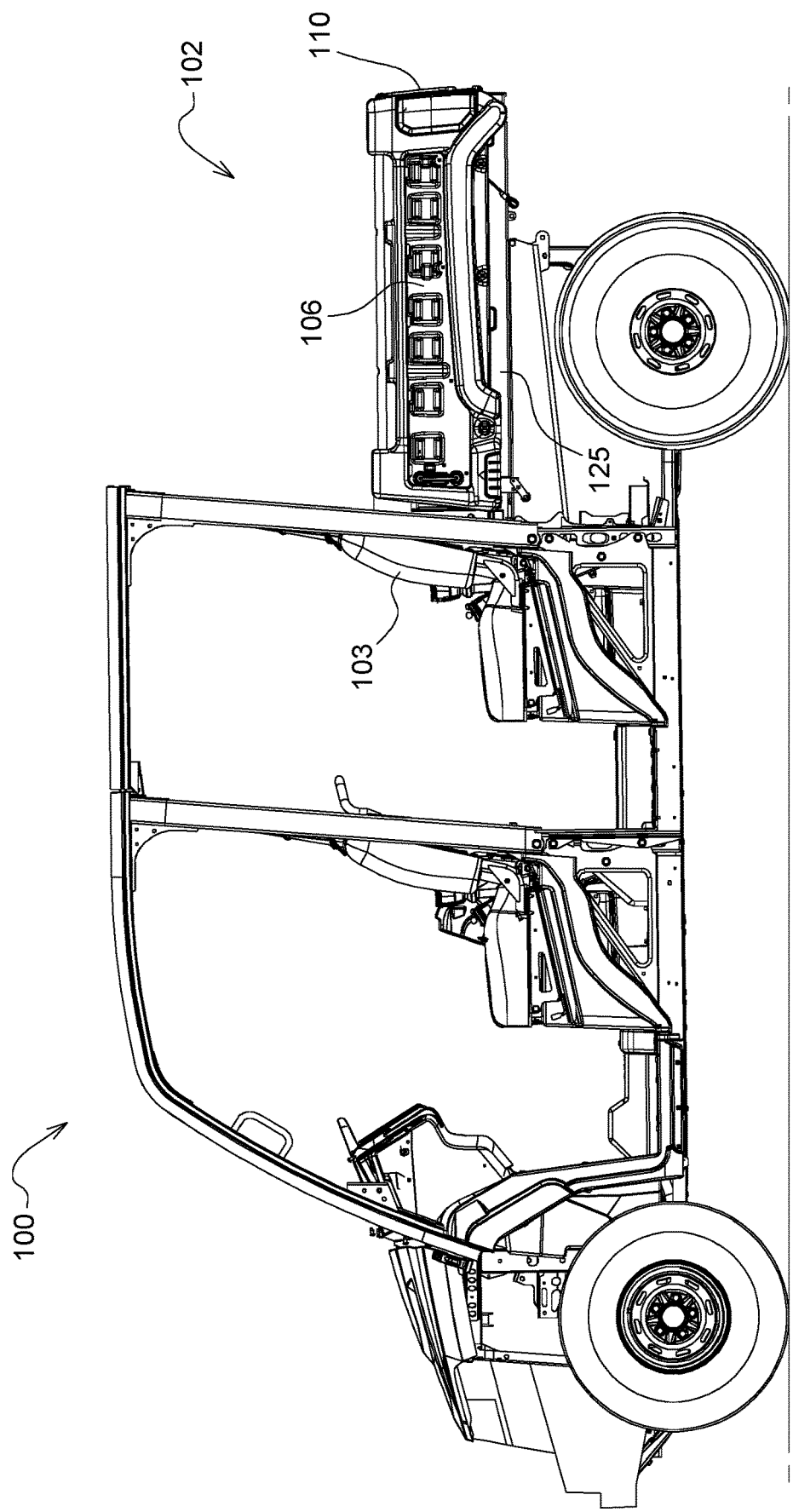
FIG. 1 is a side view of a utility vehicle with a transformable cargo box in a first non-extended position according to a preferred embodiment of the invention.
Figure 2:
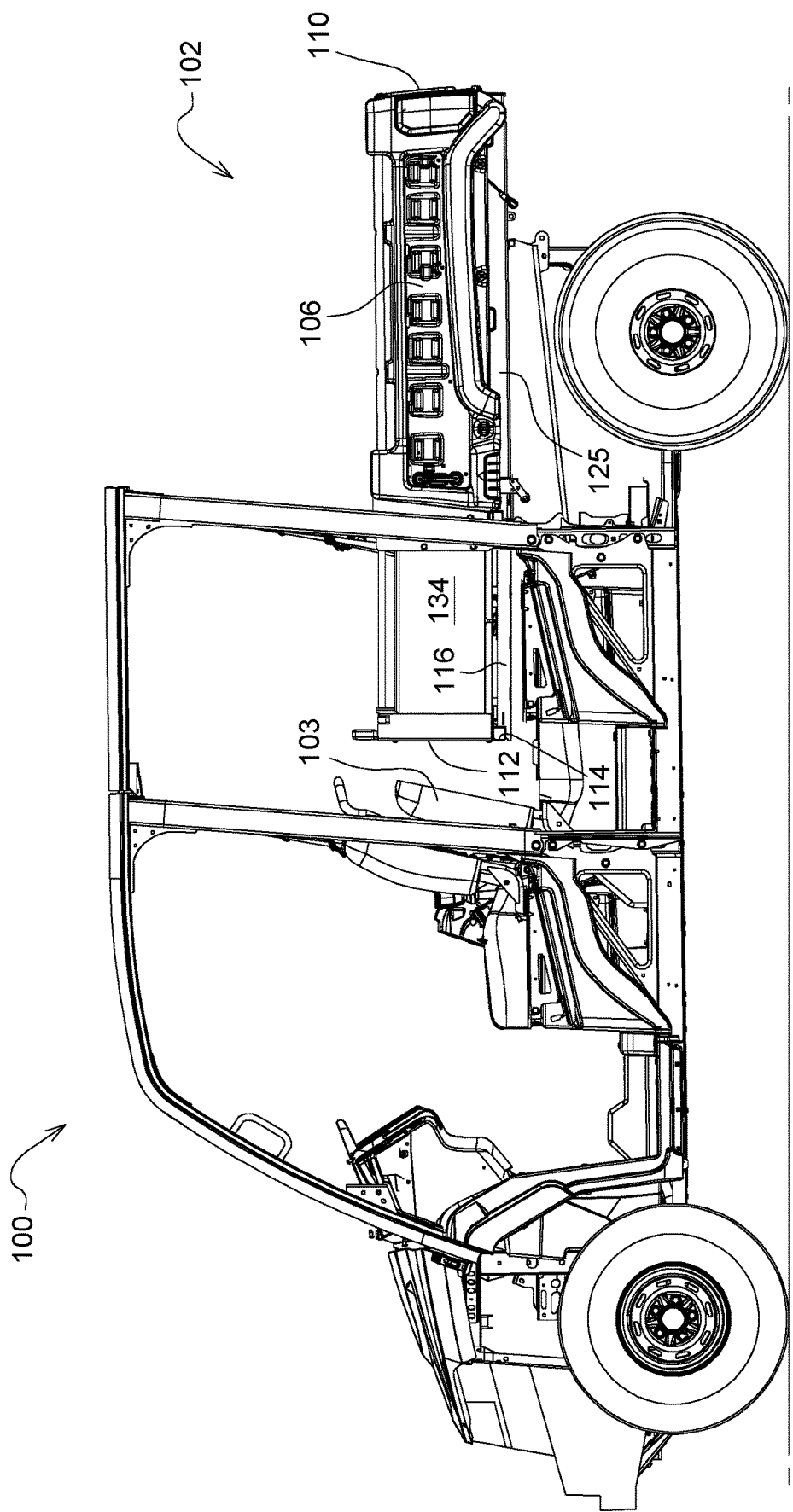
FIG. 2 is a side view of a utility vehicle with a transformable cargo box in a second extended position according to a preferred embodiment of the invention.

In a preferred embodiment shown in FIGS. 1-10, utility vehicle 100 may include transformable cargo box 102 which may be moved by an operator between a first non-extended position behind a second row of seats 103, and a second extended position after the second row of seats are folded down and forward. The transformable cargo box may have cargo bed floor 104 with fixed left and right sidewalls 106, 108 extending upwardly along the left and right sides of the floor. The cargo bed floor, and fixed left and right sidewalls 106, 108 may be supported by utility vehicle frame 125. The left and right sidewalls may be molded plastic, composite or metal, and optionally may include an accessory bar along an upper portion of the sidewalls. The transformable cargo box also may include tail gate 110 which may be hinged to the rear of the transformable cargo box for pivoting between a raised position along the back of the cargo box and a lowered position for dumping or removing cargo or materials from the cargo box. The transformable cargo box may be raised for dumping in the first non-extended position or the second extended position.

Figure 3:
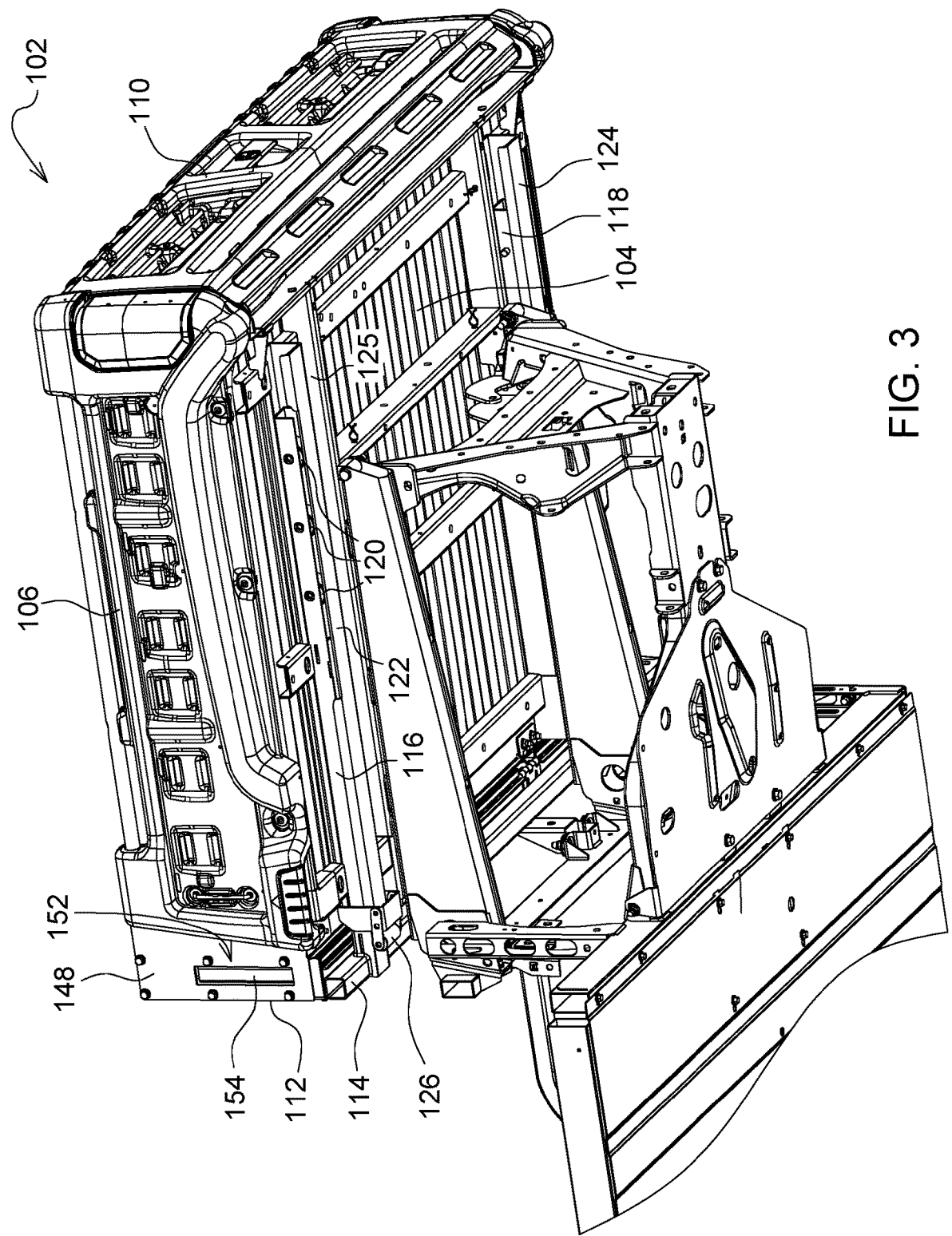
FIG. 3 is a perspective view of the underside of a utility vehicle transformable cargo box in a first non-extended position according to a preferred embodiment of the invention.
Figure 4:
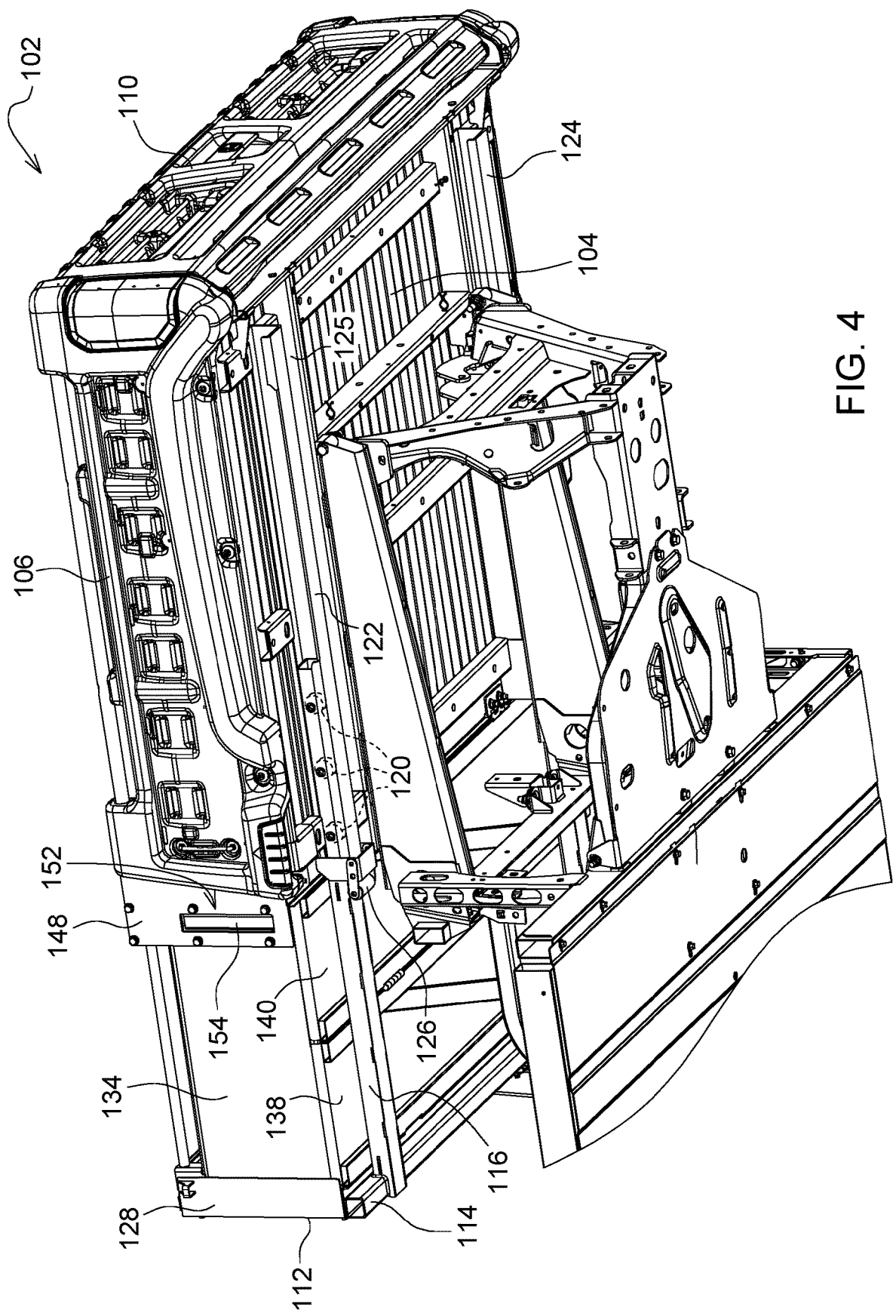
FIG. 4 is a perspective view of the underside of a utility vehicle transformable cargo box in a second extended position according to a preferred embodiment of the invention.
Figure 6:
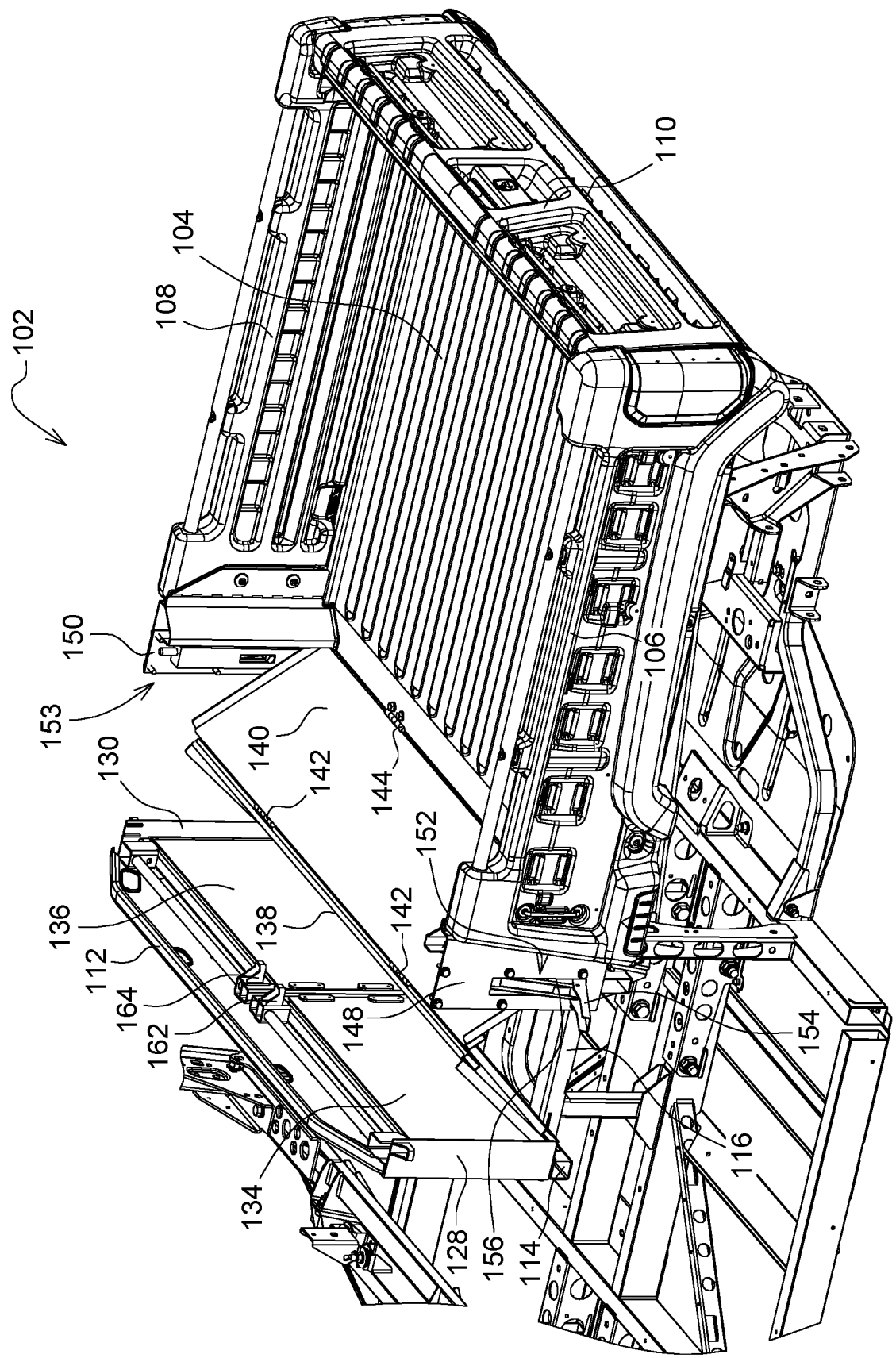
FIG. 6 is a perspective view of the top of a utility vehicle transformable cargo box with the first and second base panels between the first non-extended position and the second extended position according to a preferred embodiment of the invention.
Figure 7:
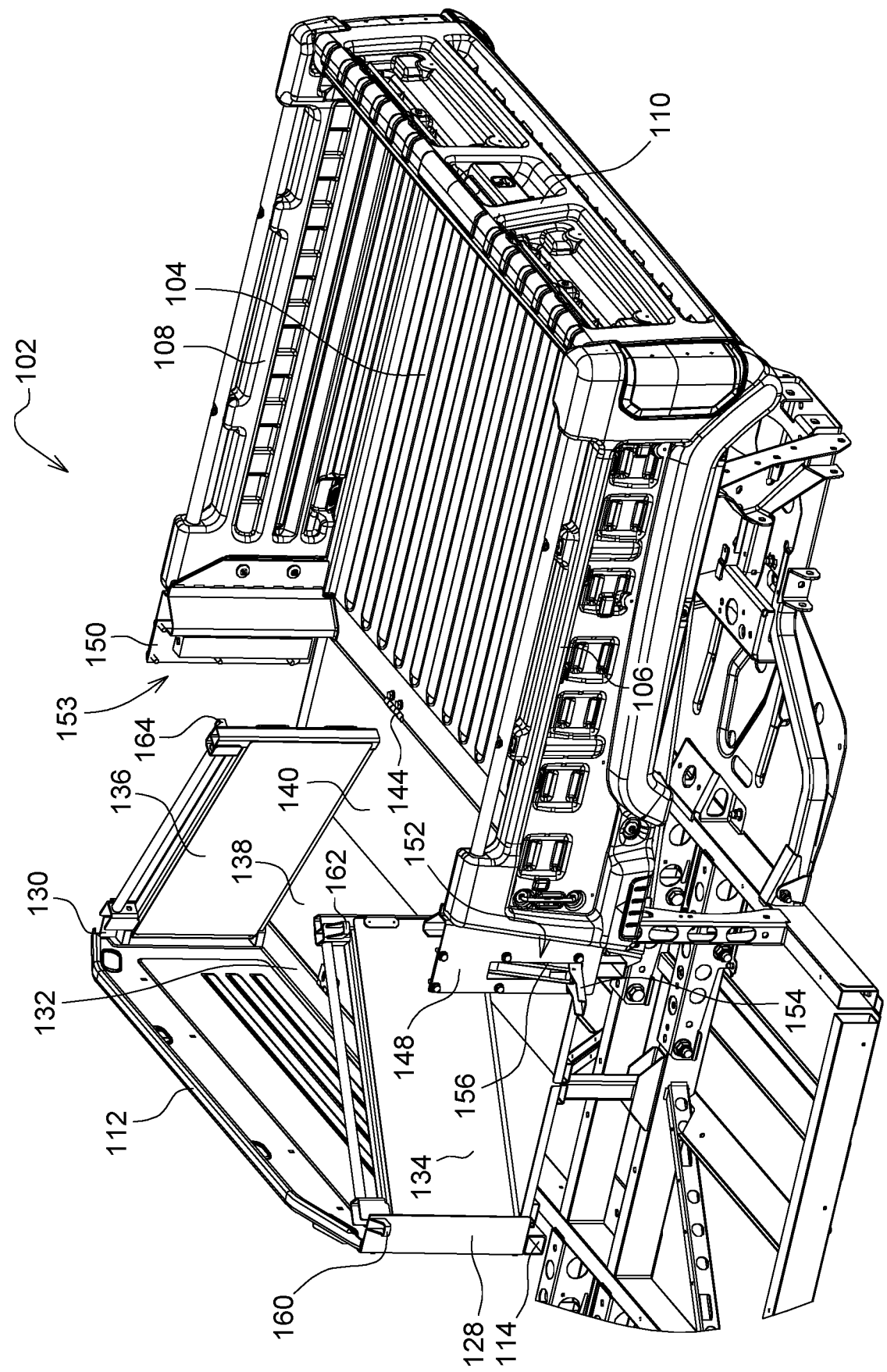
FIG. 7 is a perspective view of the top of a utility vehicle transformable cargo box with the first and second side extension panels between the first non-extended position and the second extended position according to a preferred embodiment of the invention.

In a preferred embodiment, transformable cargo box 102 may include load guard 112 that an operator may slide between a first non-extended position and a second extended position. In the first non-extended position, load guard 112 may close the front of the transformable cargo box. As shown in FIGS. 3 and 4, load guard 112 may be mounted to cross member 114 and to a pair of longitudinal members 116, 118, all of which may slide forwardly and rearwardly with the load guard between the first non-extended position and the second extended position. A plurality of rollers 120 may be mounted to each of the longitudinal members 116, 118. The rollers may be positioned to rotate while they ride in channels 122, 124 attached to utility vehicle frame 125 as the operator moves the transformable cargo box between the first non-extended position in FIG. 3 and the second extended position in FIG. 4. Additionally, one or more rollers 126 may be mounted to the utility vehicle frame under each of the longitudinal members, and may help support the forward end of the transformable cargo box. As shown in FIGS. 6 and 7, left end plate 128 and right end plate 130 may be provided on the left and right ends of load guard 112, and may extend rearwardly from the load guard toward the left and right sidewalls. Additionally, bottom plate 132 may be provided on the bottom of load guard 112, and may extend rearwardly from the load guard toward the cargo box floor.

In a preferred embodiment, as shown in FIGS. 5-8, transformable cargo box 102 may include left side extension panel 134 and right side extension panel 136. The left and right side extension panels 134, 136 may be moved by the operator between the first non-extended position and the second extended position. In the first non-extended position, both side extension panels may be positioned against load guard 112, as shown in FIG. 6. The left and right side extension panels may be pivotably hinged to left and right end plates 128, 130, and may pivot forwardly on hinges to a location next to the rear facing surface of load guard 112, or rearwardly toward the sides of the transformable cargo box in the second extended position shown in FIG. 8.

Figure 5:
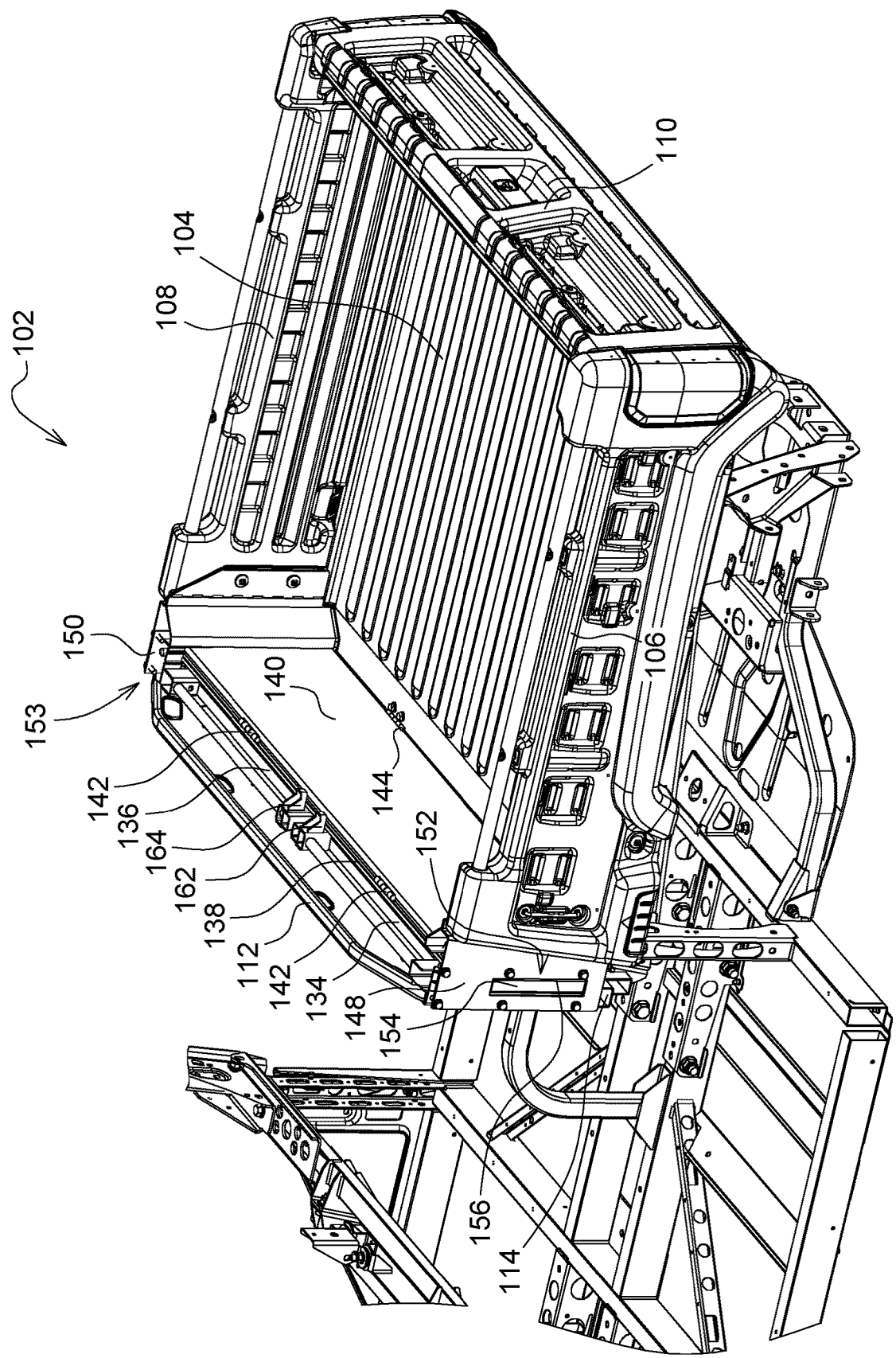
FIG. 5 is a perspective view of the top of a utility vehicle transformable cargo box in a first non-extended position according to a preferred embodiment of the invention.
Figure 8:
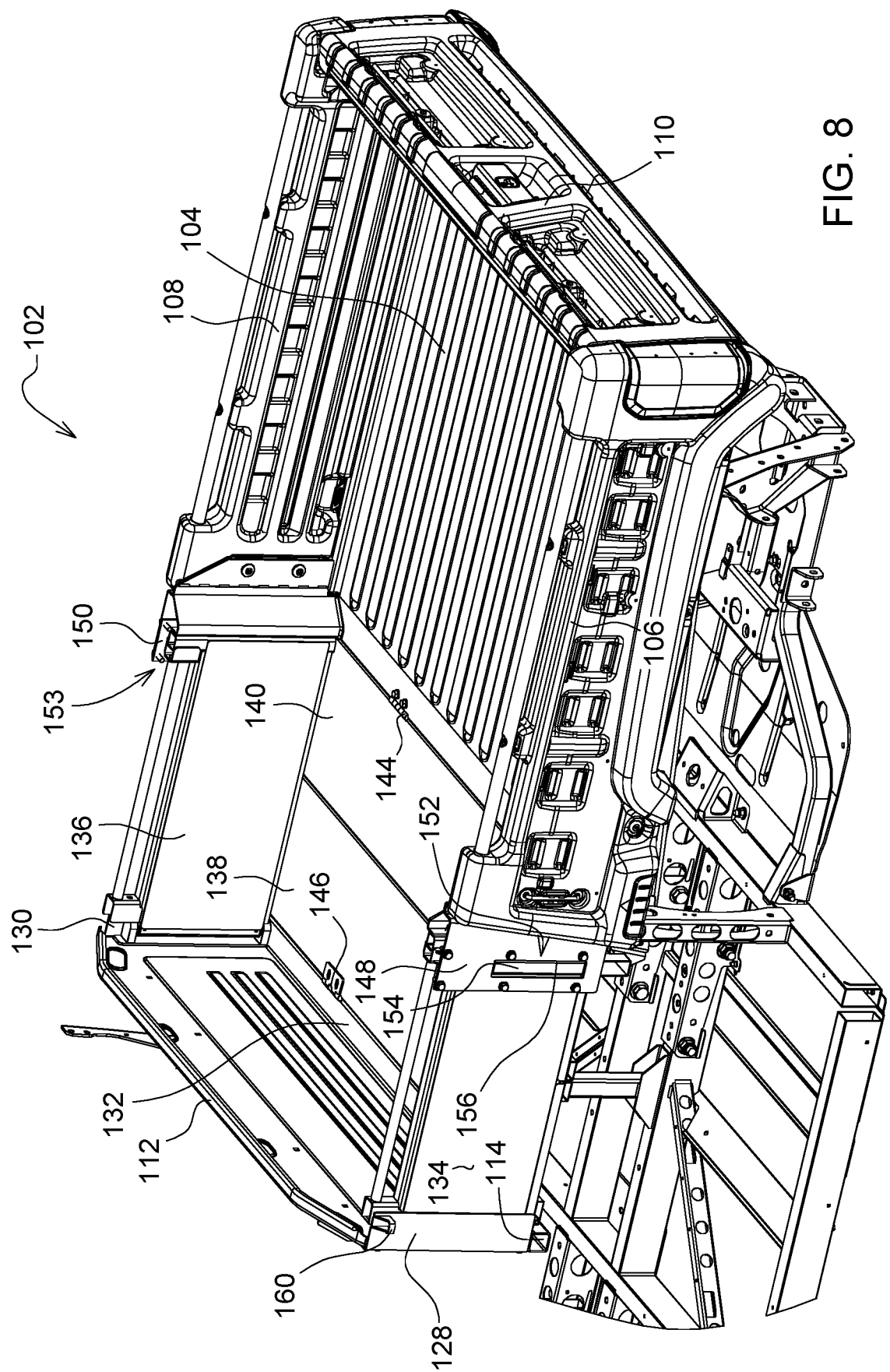
FIG. 8 is a perspective view of the top of a utility vehicle transformable cargo box in a second extended position according to a preferred embodiment of the invention.

In a preferred embodiment, as shown in FIGS. 5-8, transformable cargo box 102 may include first base panel 138 and second base panel 140. The first and second base panels 138, 140 may fold between the first non-extended position and the second extended position. In the first non-extended position, the first and second base panels may be positioned up against the left and right side extension panels 134, 136 at the front of the transformable cargo box, as shown in FIG. 5. In the second extended position, the first and second base panels may unfold to a generally horizontal orientation, as shown in FIGS. 7 and 8. The forward edge of first base panel 138 may be connected with one or more hinges 146 to bottom plate 132 which extends rearwardly from the bottom edge of load guard 112. The rear edge of first base panel 138 may be connected by one or more hinges 142 to the forward edge of second base panel 140. The rear edge of second base panel 140 may be connected with one or more hinges 144 to cargo bed floor 104.

Figure 9:
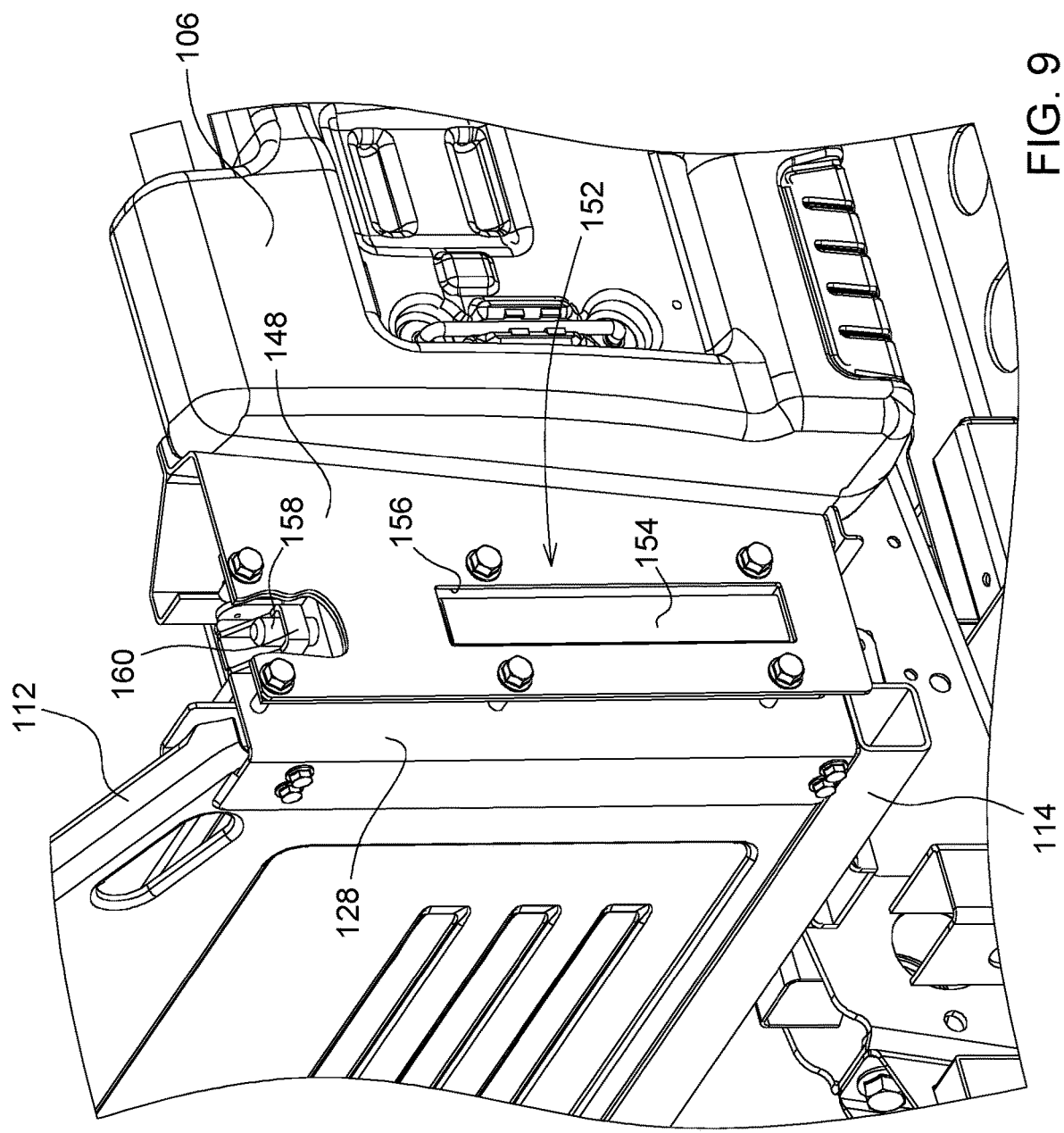
FIG. 9 is a perspective view of a latch on the utility vehicle transformable cargo box that is engaged to the load guard.
Figure 10:
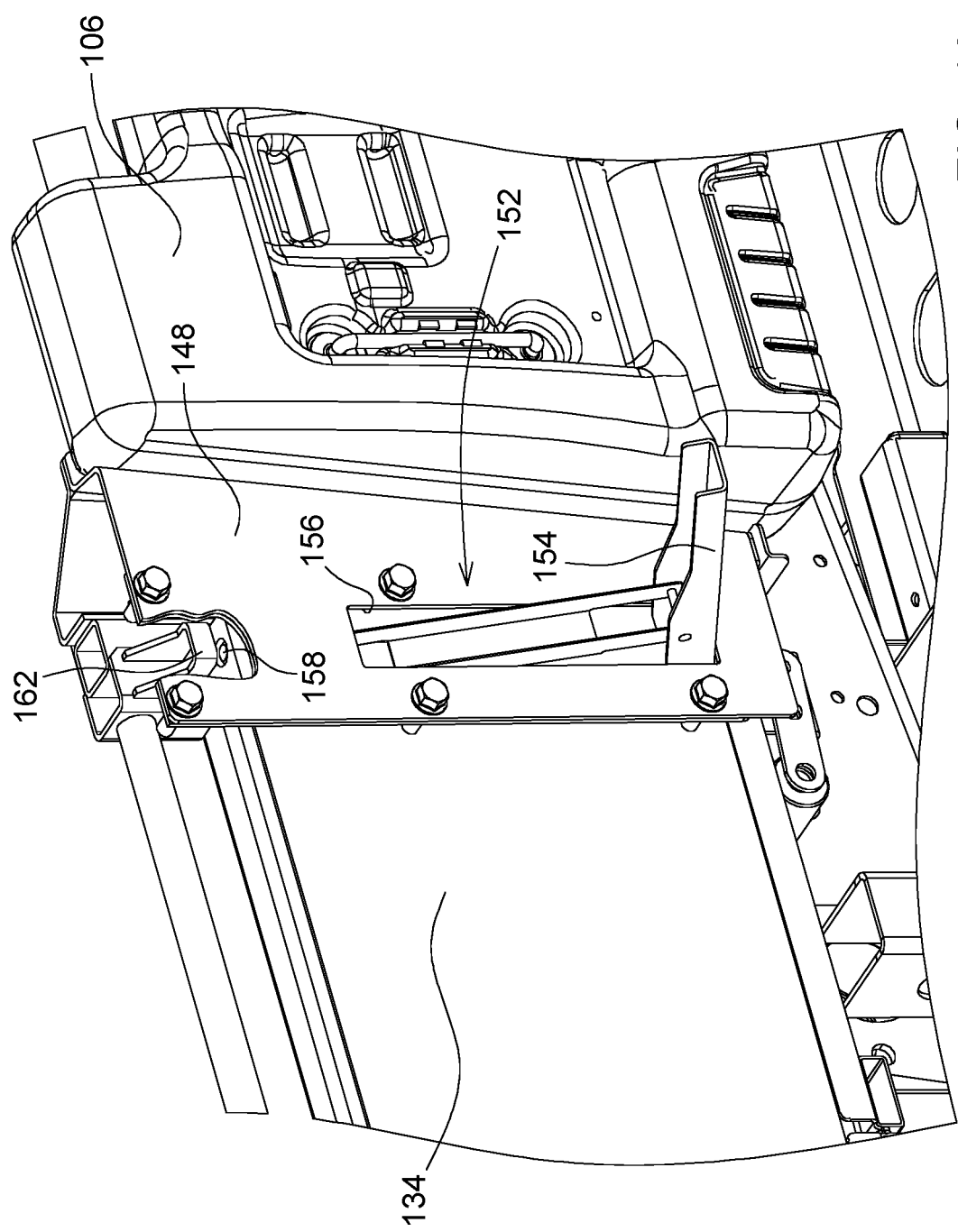
FIG. 10 is a perspective view of a latch on the utility vehicle transformable cargo box that is disengaged from a side extension panel.

In a preferred embodiment, transformable cargo box 102 may include left latch mechanism 152 and right latch mechanism 153 adjacent the forward ends of left and right side walls 106, 108. As shown in FIG. 9, each latch mechanism may engage load guard 112 to lock the transformable cargo box in the first non-extended position. As shown in FIG. 10, each latch mechanism also may engage one of the side extension panels 134, 136 to lock the transformable cargo box in the second extended position. Each latch mechanism also may be disengaged by the operator so that he or she may move the transformable cargo box between the first non-extended position and the second extended position. For example, each latch mechanism may include handle 154 attached to pawl or rod 158 which may engage the load guard by extending upwardly through receptacle 160, or engage one of the side extension panels by extending upwardly through one of receptacles 162, 164. The operator may pull down on handle 154 to lower the pawl or rod 158 out from the receptacle to disengage the latch from the load guard or side extension panel. For example, each latch mechanism may be mounted in an adapter bracket 148, 150 at the forward end of left and right side walls 106, 108, and the handles of the latches may extend through opening 156 in each adapter bracket.

The transformable cargo box may include various alternative latch mechanisms. For example, the latch mechanism may have a handle or grip that the operator may slide vertically up to move a pawl or rod into engagement with a receptacle on the load guard or on each side extension panel, or down to disengage the load guard or side extension panel. Alternative latch mechanisms may include handles that swing laterally outwardly instead of vertically, and latch mechanisms having one or more jaws positioned near the forward ends of the side walls, each jaw engaging and closing around a rod on the load guard or each side extension panel.

In one embodiment, an operator may change transformable cargo box 102 from the first non-extended position to the second extended position by first moving the rear seats forward and downward. The operator then may pull down the handles on left and right latch mechanisms 152, 154 to disengage load guard 113. The operator then may slide load guard 112 forward over the area previously occupied by the rear seats. As the load guard slides forward, the load guard forces the first base panel and second base panel to unfold until the two base panels are positioned generally horizontally in front of the cargo bed floor. The operator then may pivot the left and right side extension panels rearwardly toward the left and right side walls. Once the side extension panels are in line with the side walls, the operator may raise the handles on the left and right latch mechanisms to engage the left and right side extension panels.

Having described the preferred embodiment, it will become apparent that various modifications can be made without departing from the scope of the invention as defined in the accompanying claims.

We claim:

1. A utility vehicle transformable cargo box, comprising:
   a load guard on a front of a cargo box; the load guard positionable at a first non-extended position behind a seating area and a second extended position at least partially over the seating area and;
   a pair of side extension panels; each side extension panel hinged to the load guard and positioned up against the load guard in the first non-extended position, and each side extension panel extending rearwardly from the load guard to a sidewall of the cargo box in the second extended position; and
   a first base panel hinged to the load guard; a second base panel hinged between the first base panel and a floor of the cargo box; the first and second base panels folded against the pair of side extension panels in the first non-extended position; and the first and second base panels positioned horizontally in front of the cargo box floor in the second extended position.

2. The utility vehicle transformable cargo box of claim 1 wherein the load guard is mounted to a cross member and to a pair of longitudinal members which slide forwardly and rearwardly with the load guard between the first non-extended position and the second extended position.

3. The utility vehicle transformable cargo box of claim 2 further comprising a plurality of rollers mounted to each of the longitudinal members.

4. The utility vehicle transformable cargo box of claim 1 further comprising a pair of latches; each latch positioned on a forward portion of one of the sidewalls; each latch securing the load guard in the first non-extended position and securing one of the side extension panels in the second extended position.

5. A utility vehicle transformable cargo box, comprising:
a load guard enclosing a front of the cargo box;
a pair of side extension panels positioned up against the load guard in a first non-extended position, and aligned with a pair of cargo box walls in a second extended position; and
a pair of base panels folded up against the side extension panels in the first non-extended position, and unfolded and positioned horizontally in the second extended position.

6. The utility vehicle transformable cargo box of claim 5, wherein the pair of base panels are hinged to each other, and one of the base panels is hinged to the load guard, and one of the base panels is hinged to a cargo box floor.

7. The utility vehicle transformable cargo box of claim 5 further comprising a latch engaging the load guard in the first non-extended position, and engaging one of the side extension panels in the second extended position.

8. The utility vehicle transformable cargo box of claim 5 further comprising a cross member and a pair of longitudinal members supporting the load guard.

9. A utility vehicle transformable cargo box, comprising:
a cargo box floor with a pair of cargo box walls;
a first base panel hinged a front of the cargo box floor;
a second base panel hinged to a front of the first base panel and to a load guard that is slideable between a first non-extended position and a second extended position;
a pair of side extension panels; each side extension panel hinged to an end of the load guard; each side extension panel is positioned up against the load guard in the first non-extended position and extends between the load guard and one of the cargo box walls in the second extended position;
a pair of latches; each latch engaging one of the ends of the load guard in the first non-extended position, and engaging one of the side extension panels in the second extended position.

10. The utility vehicle transformable cargo box of claim 9 wherein each latch engages a receptacle on the load guard and side extension panel.

11. A utility vehicle transformable cargo box of claim 9, wherein the base panels are folded against the side extension panels in the first non-extended position.

* * * * *